United States Patent [19]

Easterwood

[11] Patent Number: 5,433,467
[45] Date of Patent: Jul. 18, 1995

[54] TRAILER TONGUE HITCH AND BALL CLAMP

[76] Inventor: Doris E. Easterwood, 2517 Stagestand, Duncan, Okla. 73533

[21] Appl. No.: 172,983

[22] Filed: Dec. 27, 1993

[51] Int. Cl.$^6$ ............................................. B60D 1/06
[52] U.S. Cl. .................................. 280/507; 280/504; 280/511
[58] Field of Search ...................... 280/504, 507, 511; 70/14

[56] References Cited

U.S. PATENT DOCUMENTS

| 3,522,958 | 8/1970 | Lusignan | 280/511 |
| 4,208,065 | 6/1980 | Hansen | 280/507 |
| 4,459,832 | 7/1984 | Avrea et al. | 70/14 |

FOREIGN PATENT DOCUMENTS 8702736  6/1989  Netherlands ................ 280/504

Primary Examiner—Mitchell J. Hill
Attorney, Agent, or Firm—Robert K. Rhea

[57] ABSTRACT

A trailer tongue hitch and ball clamp assembly includes a base portion loosely surrounding the hitch ball shank between its sphere and a tow bar transversely of the depending surface of the trailer hitch coupling socket forming member. A bridge portion of the clamp assembly, secured to the base portion, transversely overlies the upper surface of the hitch coupling for impinging it against the base member in surrounding relation with respect to the hitch ball sphere which permits the clamp assembly to move as a unit with the trailer tongue socket forming member in its horizontal and vertical pivoting movement relative to the hitch ball.

9 Claims, 1 Drawing Sheet

TRAILER TONGUE HITCH AND BALL CLAMP

BACKGROUND OF THE INVENTION

This invention relates to automotive vehicle accessories and more particularly to a clamp joining a trailer tongue hitch to a towing vehicle trailer hitch ball.

1. Field of the Invention

Vehicles such as automobiles and trucks are frequently utilized to pull other wheeled vehicles, such as utility trailers or mobile homes.

The towing and towed vehicle are usually connected together by coupling members generally referred to as "trailer hitches". A trailer hitch usually comprises a spherical ball connected with a towing bumper or plate by a stem projecting vertically downwardly through the bumper or plate.

The towed or trailing vehicle is usually provided at its forward end with a tongue member terminating at its forward end in a coupling member featuring a part spherical socket which receives a spherical portion of the hitch ball. The socket forming member is normally maintained in contact with the hitch ball by a forwardly projecting cleat contacting a depending portion of the ball spherical surface generally opposite the socket.

Towing forces generate strenuous forces involving both horizontal and vertical loading on the socket member. When the vertical loading is in a negative direction it sometimes forces the cleat toward the under side of the ball with a sudden or quick impact which may damage it and result in disengagment of the socket forming coupling from the hitch ball.

Most highway motor vehicle safety codes require the use of safety chains extending between the towing and towed vehicles. However, in the event of separation of the coupling members joining the towed vehicle to the towing vehicle, the chain connection between the vehicles, as a result of the mass of the towed vehicle, may result in an uncontrollable situation with respect to the towing vehicles and result in an accident to both vehicles and or the occupants of the towing vehicle.

This invention overcomes the above problems by securing the trailer hitch socket to the hitch ball.

2. Description of the Prior Art

U.S. Pat. No. 3,522,958 issued Aug. 4, 1970 to Lusignan for GUARD FOR TRAILER HITCH, U.S. Pat. No. 4,208,065 issued Jun. 17, 1980 to Hansen for COUPLING GUARD and U.S. Pat. No. 4,459,832 issued Jul. 17, 1984 to Avrea et al for TRAILER HITCH LOCK generally represents the state-of-the-art.

Each of these and other patents of which I am aware feature a base member which is rigidly attached to the hitch ball mounting member and a second component which overlies in closed spaced or contacting relation the trailer hitch ball socket forming member.

This invention is distinctive over these and other patents by providing a clamp assembly which features a base portion loosely surrounding the hitch ball shank between its sphere and a tow bar and transversely contacts the depending surface of the trailer hitch coupling socket forming member. A bridge portion of the clamp assembly transversely overlying the upper surface of the hitch coupling impinges it in surrounding relation with respect to the hitch ball against the base member. This permits the clamp assembly to move as a unit with the trailer tongue socket forming member in its horizontal and vertical pivoting movement relative to the hitch ball.

SUMMARY OF THE INVENTION

A base member having an aperture loosely surrounds the stem of a hitch ball between its spherical portion and a mounting member.

An inverted U-shaped bridge member has the depending end portion of its respective legs integrally connected to opposing ends of the base member with its bight portion forming a bridge extending transversely across the socket forming member of a trailer hitch coupling.

A pair of juxtaposed filler plates overlie the base and m are secured against lateral movement relative to the base. The filler plates are provided with confronting recesses forming an opening of smaller diameter than the diameter of a hitch ball.

A shaft extending through and vertically adjustable relative to the bridge forming bight portion contacts the top surface of the trailer hitch coupling socket forming member for impinging it against against the filler plates for movement of the clamp assembly as a unit, in a horizontal or vertical pivoting movement with the trailer hitch coupling relative to the hitch ball. The clamp assembly is, thus, readily moveable from one vehicle to another.

The principal objects of this invention are to provide a trailer hitch ball and socket clamp which: securely maintains the socket in contact with the hitch ball; is quickly and conveniently installed or released; will eliminate the need for other and sometimes less effective safety devices; and, may be moved from one trailer hitch assembly to another without modification of any of the components thereof or the use of special tools or skills.

DESCRIPTION OF THE PREFERRED EMBODIMENTS

Figure 1:
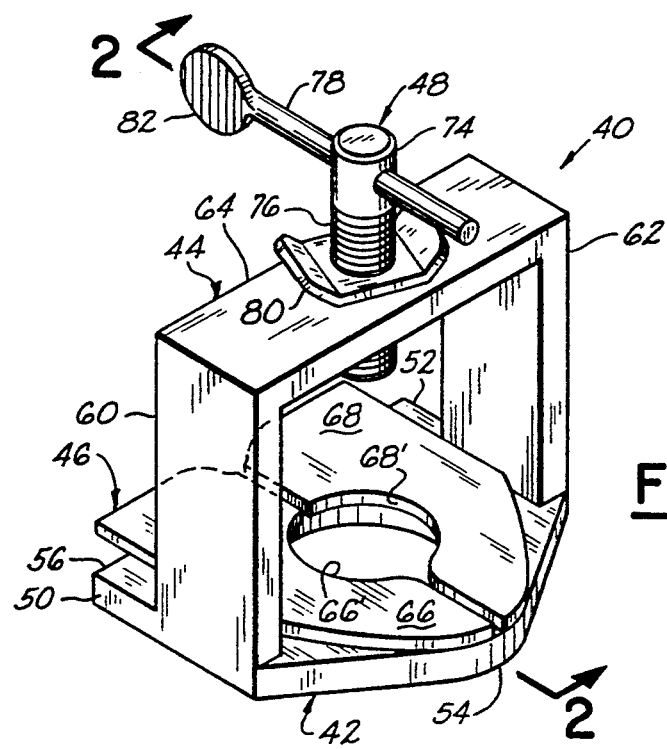
FIG. 1 is perspective view of the clamp assembly, per se.

Like characters of reference designate like parts in those figures of the drawings in which they occur.

Figure 2:
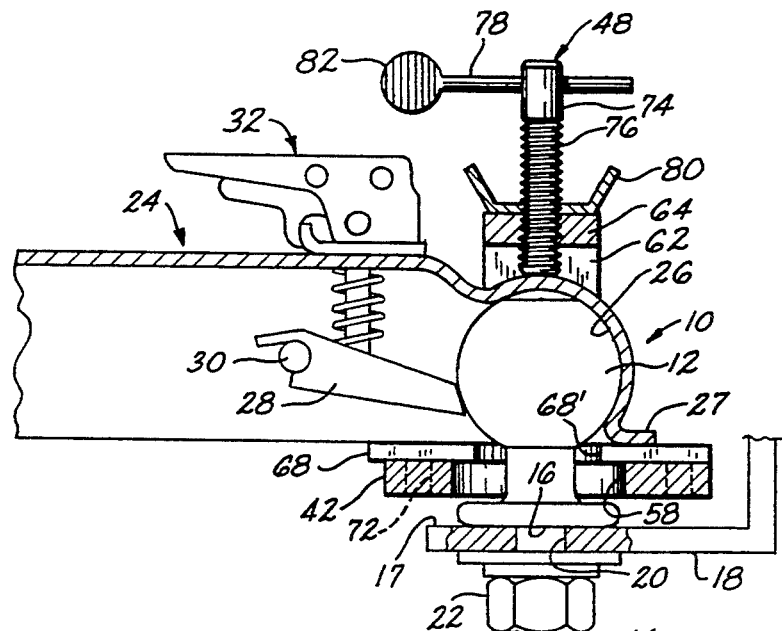
FIG. 2 is a vertical cross sectional view taken substantially along the line 2—2 of FIG. 1 and illustrating the clamp assembly securing a trailer hitch socket to a hitch ball; and, FIG. 3 is a perspective view of one of the clamp retainer plates, per se.
Figure 3:
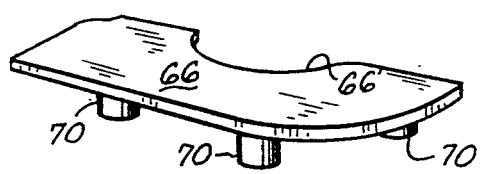

In the drawings:

Referring first to FIG. 2, the reference numeral 10 indicates a substantially conventional trailer hitch assembly comprising a hitch ball 12 having a shank 14 provided with an annular shoulder 16 which rests upon the upper surface 17 of a towing member such as a rear bumper 18 having an aperture 20 receiving the shank 14 secured by nuts and washers 22.

The numeral 24 indicates a fragmentary forward end portion of a trailer hitch tongue provided with a part spherical socket 26 cooperatively nesting a spherical portion of the hitch ball 12 which is held in place by a cleat 28 vertically pivotable about a shaft 32 and moved toward and away from the hitch ball 12 by a toggle link assembly 32.

The above description forms no part of the present invention other than to set forth the combination with which the trailer hitch socket and hitch ball clamping assembly 40 is intended to be used.

Briefly stated, the clamp assembly 40 comprises: a base plate 42 loosely surrounding the shank 14 of the hitch ball 12; a bridge means 44 secured to the base and transversely spanning the socket portion 26 of the trailer hitch tongue 24; filler plates 46 overlying the base plate for preventing removal of the base plate from the hitch ball; and, a screw clamp means 48 impinging the trailer tongue socket against the filler plates and base.

The base 42 is preferably formed from rigid planar material having a length between its respective end edge surfaces 50 and 52 greater than the transverse width of the outer surface of the depending flanged edge 27 of the trailer hitch tongue 24 for the reasons believed readily apparent.

The transverse dimension of the base 42 between its forward and rearward edges 54 and 56 is such that it may be freely received by the upper surface 17 of the towing hitch bumper or plate 18. The forward surface 54 of the base diverges from its central forward portion for the reasons presently explained.

The bridge means 44 comprises an inverted U-shaped member having parallel vertically disposed legs 60 and 62 secured at their depending ends to respective end portions of the base and having a length substantially greater than the vertical dimension of the socket forming forward end portion of the trailer tongue 24 for freely receiving the trailer tongue therein as presently explained. The legs 60 and 62 are joined at their upper ends by a horizontal bight portion 64 forming a bridge across the socket 26.

The filler plates 46 comprise a pair of juxtaposed plates 66 and 68 flatly overlying the upper surface of the base plate 42 and having recesses 66' and 68' disposed in confronting relation for forming an aperture of smaller diameter than the the hitch ball sphere to prevent upward separating movement of the clamp assembly 40 relative to the hitch ball. Each of the filler plates 66 and 68 are provided with a plurality (3), in the example shown, of depending locator pins 70 cooperatively received by base apertures 72 (FIG. 2) to prevent displacement of the filler plates 46 relative to the base plate.

The shaft means 48 comprises a shaft 74 having external threads 76 cooperatively received by a threaded aperture in the bridge 64 medially its length. A transverse aperture in the shaft 74 slidably receives a pin-like handle 78 for angularly rotating the depending end of the shaft into engagement with the top surface of the trailer tongue forming the socket 26 and impinge the filler plates and base plates against the depending flanged edge 27 of the trailer tongue.

OPERATION

In operation, the clamp assembly 40, with the filler plates 46 removed, is transversely disposed to encompass the socket end portion of the trailer tongue 24. The clamp unit and trailer tongue, as a unit, is moved over the position of the hitch ball and manually lowered wherein the base plate opening 58 slidably receives the sphere of the hitch ball and the base plate initially rests on the upper surface 17 of the tow bar.

The toggle link 32 is operated to engage the cleat 28 with the hitch ball sphere, thus, supporting the depending flanged edge 27 of the trailer tongue in spaced relation with respect to the top surface of the base plate 42.

The filler plates 46 are then manually interposed between the depending surface of the trailer tongue flange edged 27 and top surface of the base plate 42 with the anchor pins 70 entering the base plate apertures 72. The handle 78 is then utilized to angularly rotate the shaft 74 which, by contacting the upper surface of the trailer tongue forming the socket 26, progressively moves the filler plates and base plate upwardly against the depending surface of the flanged edge 27. A locknut 80 on the shaft 74 is tightened to prevent angular rotation of the shaft 74 relative to the clamp bridge 64. The clamp assembly 40 then moves with the trailer hitch tongue 24 as it pivots with the tongue in a horizontal direction about the vertical axis of the hitch ball shaft and similarly pivots vertically with the trailer hitch tongue 24 about a diametric horizontal axis through the sphere of the hitch ball 12.

The clamp assembly 40 is removed from the trailer tongue and hitch ball by reversing the installation procedure. After loosening the locknut 80 and unscrewing the shaft 74 from contact with the trailer tongue socket portion 26, the base plate 42 rests on or at least is near the upper surface 17 of the tow bar. Since the filler plates 46 are sometimes, through the rigors of use in towing a trailer, wedged tight within their apertures 72 one end portion of the handle 78 is flatened, as at 82, to act in screwdriver fashion, when removed from the shaft 74, to lift or pry the plates 66 and 68 off the base plate 42.

Obviously the invention is susceptible to changes or alterations without defeating its practicability. Therefore, I do not wish to be confined to the preferred embodiment shown in the drawings and described herein.

I claim:

1. In combination with vehicle trailer hitch components including a hitch tongue having a forward end portion and a depending flanged edge and having a downwardly open ball socket adjacent its depending edge at its forward end portion secured to a hitch ball sphere having a shank secured to a towing vehicle tow bar, the improvement comprising:

plate means including a base having an opening for slidably receiving the hitch ball sphere and loosely surrounding an intermediate portion of the hitch ball shank;

filler plate means overlying the base plate means for forming a hitch ball shank surrounding aperture smaller than the hitch ball sphere; and, clamp means including a bridge member secured to the base plate means and transversely overlying the forward end portion of the hitch tongue for impinging the plate means against the depending flanged edge of the hitch tongue.

2. The combination according to claim 1 in which the clamp means further includes:

shaft means supported by the bridge member for biasing the trailer tongue socket toward the hitch ball.

3. The combination according to claim 2 in which the shaft means includes:

a screw threaded shaft; and, a handle for angularly rotating said shaft.

4. The combination according to claim 1 in which the filler plate means comprises:

a pair of juxtaposed plates each having a part circular lateral recess confronting the recess in the opposite juxtaposed plate.

5. The combination according to claim 4 in which each plate of said pair of plates includes:

anchor pins for securing each plate of said pair of plates against lateral movement relative to said base plate.

6. In combination with vehicle trailer hitch components including a hitch tongue having a forward end portion and a depending flanged edge and having a downwardly open ball socket adjacent its depending edge at its forward end portion secured to a hitch ball having a shank secured to a towing vehicle tow bar, the improvement comprising:

clamp means including a base member and an inverted U-shaped member transversely secured as a unit to the forward end portion of the hitch tongue for vertical and horizontal pivoting movement with the hitch tongue and maintaining the hitch ball within the socket; and, filler plate means including a pair of juxtaposed plates each having a part circular lateral recess confronting the recess in the opposite juxtaposed plate and overlying the base member for forming a hitch ball shank surrounding aperture smaller than the hitch ball.

7. The combination according to claim 6 in which the clamp means further includes:

shaft means supported by the U-shaped member for biasing the trailer tongue socket toward the hitch ball.

8. The combination according to claim 7 in which the shaft means includes:

a screw threaded shaft; and, a handle for angularly rotating said shaft.

9. The combination according to claim 6 in which each plate of said pair of plates includes:

anchor pins for securing each plate of said pair of plates against lateral movement relative to said base member.

* * * * *